April 2, 1935.  C. B. KRAUSE  1,996,476
VARIABLE SPEED MOTOR
Filed Jan. 7, 1933     2 Sheets-Sheet 1

INVENTOR:
CONRAD B. KRAUSE
ATTORNEYS

April 2, 1935.                     C. B. KRAUSE                          1,996,476
                                VARIABLE SPEED MOTOR
                                Filed Jan. 7, 1933                  2 Sheets-Sheet 2

INVENTOR:
CONRAD B. KRAUSE
ATTORNEYS

Patented Apr. 2, 1935

1,996,476

UNITED STATES PATENT OFFICE 1,996,476

VARIABLE SPEED MOTOR

Conrad B. Krause, Cleveland, Ohio, assignor of one-half to The Dill Manufacturing Company, Cleveland, Ohio, a corporation of Ohio Application January 7, 1933, Serial No. 650,677

2 Claims. (Cl. 172—179)

This invention relates to electric motors and, as its principal object, aims to provide an improved form of variable speed electric motor which in "low speed" is capable of developing a relatively high stalling torque (torque when the armature is barely turning), and which has a relatively low idle speed under no-load conditions.

Another object of the invention is to provide an improved form of variable speed electric motor having a series field of variable strength for regulating the motor operation at relatively high speeds and an auxiliary shunt winding adapted to be energized simultaneously with the series field for low speed operation of the motor.

It is also an object of this invention to provide a novel form of variable speed motor having series and shunt field windings in additive relation and each of substantially the same number of turns, and also having connections for said windings whereby a desired portion of the series winding may be energized independently of the shunt winding for operation of the motor at relatively high speeds, and the series winding and shunt windings may be energized simultaneously for operation of the motor at a relatively low speed.

A further object of this invention is the provision, in a series wound motor, of a shunt coil in the field which is not connected to the series field coil except through external switching means, so that in high speed the shunt coil is not energized, the motor operating in high speed as an ordinary series wound motor. As will be explained more fully hereinafter, the function of the shunt coil is to "depress" the idle speed without sacrificing stalling torque, this characteristic being secured efficiently and economically without the use of any extraneous device or accessory such as coils or resistances, outside of the motor proper, other than a simple and inexpensive controlling switch.

Other objects and advantages of the invention will be apparent from the following description, when taken in conjunction with the accompanying sheets of drawings, wherein.

For a more detailed disclosure of my invention, reference will now be made to the drawings, wherein I have illustrated what I now regard to be the preferred forms of my improved variable speed motor. As will be explained more fully hereinafter, my improved motor is both practical and efficient, and is capable of developing a high torque at its different operating speeds, with relatively low current consumption. Although my improved motor is adaptable to any service where an efficient variable speed motor is needed, I have found it to be especially suitable for driving mixing machines of the domestic type wherein all of the available speeds are frequently used and wherein the high stalling torque and low idle speed are important factors.

Figure 1:
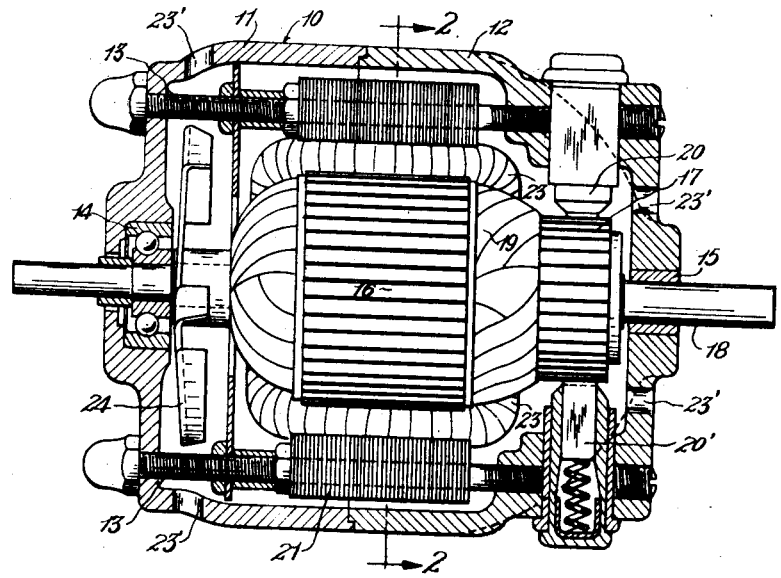
Fig. 1 is a longitudinal sectional elevation taken through an electric motor constructed according to my invention.
Figure 2:
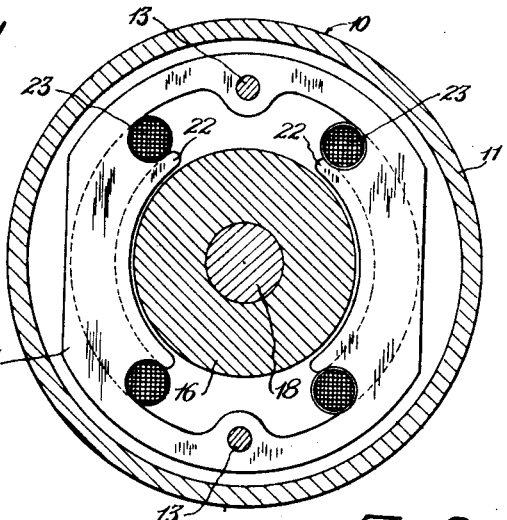
Fig. 2 is a transverse sectional view thereof taken substantially as indicated by line 2—2 of Fig. 1.

As shown in Figs. 1 and 2 of the drawings, my improved motor is provided with a frame 10 which, for convenience of manufacture and assembly, may be formed in sections 11 and 12 which are secured together by means of screws 13. The sections 11 and 12 are provided with suitable bearings, such as the anti-friction bearing 14 and the plain bearing 15 in which the armature 16 is rotatably supported. The armature is constructed with the usual commutator 17 mounted on the armature shaft 18, and with suitable windings 19 which are connected with the segments of the commutator. Brushes 20 and 20', of appropriate form and suitably supported on the motor frame, cooperate with the commutator 17, as shown in Fig. 1. A laminated magnetizable field core 21 is disposed around the armature to provide the desired number of field poles, in this instance the two diametrically opposed field poles 22. Magnetization of the poles 22 is obtained by energization of the field coils 23 which are mounted on these poles, as shown in Fig. 2. If desired, the frame 10 of the motor may be provided with suitable openings 23' adjacent the armature bearings and a suitable fan 24 may be mounted on the armature shaft for causing a circulation of cooling air through the openings during rotation of the armature.

Figure 3:
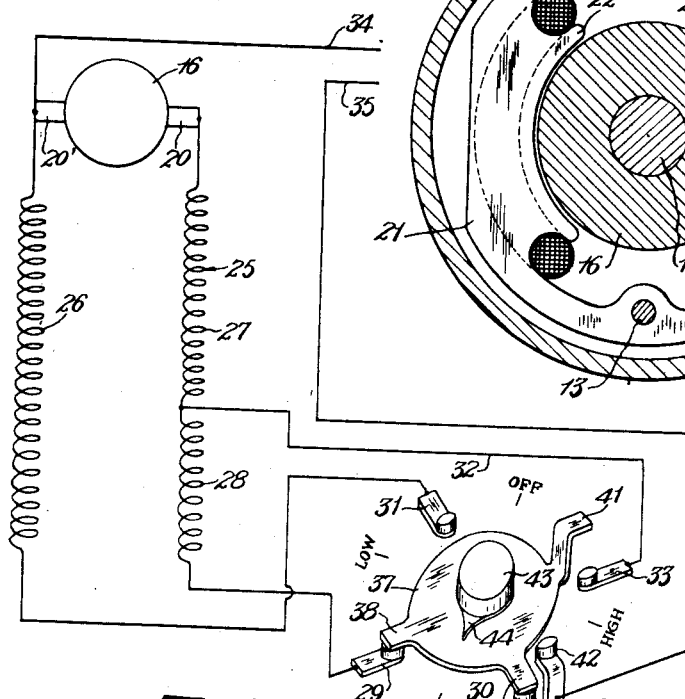
Fig. 3 is a wiring diagram of the motor, showing the circuits and connections for obtaining the different speeds.

In accordance with my invention, the field windings are so constructed and arranged that the motor will operate efficiently at the different desired speeds and will be capable of developing a high torque with relatively low current consumption. In Fig. 3 of the drawings, I have diagrammatically illustrated the circuits and connections whereby this desired variable speed operation is attained. In this diagram I have shown the field winding as comprising a series coil 25 and a shunt coil 26 in additive relation, the series coil, if desired, being composed of two sections 27 and 28. One end of the series coil is connected with the brush 20 and the other end of the series coil is connected to the contact member 29 of the manually operable control switch 30. One end of the shunt coil is connected to the brush 20' and its other end is connected to a contact 31 of the manually operable switch. A lead 32 connected to the series coil between the sections 27 and 28 thereof is connected to a contact 33 of the manually operable switch. A pair of line conductors 34 and 35 provide the current supply for operating the motor, the line conductor 34 being connected to the brush 20' and the line conductor 35 being connected to the terminal 36 of the switch.

The manually operable switch for controlling the motor circuits is here shown as being a switch of the snap type, but it will be understood, of course, that any suitable form of switch may be employed which will provide the necessary circuit connections. As here shown, the switch 30 is provided with a rotatable conducting body 37 having contact arms 38 and 39 for cooperation with the contacts 29, 31 and 33, and with the contact 40 of the terminal 36. The switch body is also provided with an offset contact 41 for cooperation with the contact 42 of the terminal 36.

When the switch body is rotated by means of the actuating knob 43, the pointer 44 may be moved either to the off position or to any one of the available speed positions indicated in the drawings. When the switch body is in position shown in Fig. 3, with the pointer 44 designating the medium speed position, the contact 38 is in engagement with the contact 29 and the contact 39 is in engagement with the contact 40. With the parts in this relation, both sections of the series field are energized from the line conductor 35 through the terminal 36, contacts 40 and 39, and through the switch body 37 and contacts 38 and 29. With the switch in this position, the shunt coil 26 remains deenergized, and with the field strength provided by the sections 27 and 28 of the series coil, the motor operates at an intermediate speed.

When high speed operation of the motor is desired, the switch body is rotated to bring the contact 39 into engagement with the contact 33, and the contact 38 into engagement with the contact 40. With this setting of the switch, the shunt coil 27 and the section 28 of the series coil remain deenergized and only the section 27 of the series coil is energized. With the field strength produced by the section 27 of the series coil, the motor operates at a relatively high speed. When the switch is rotated to the position indicated for low speed operation of the motor, the shunt coil 26 and both sections of the series coil are energized from the line conductor 35. In this position of the switch, the contact 41 engages the contact 42, and the contacts 38 and 39 engage, respectively, the contacts 31 and 29. From the operation of my improved motor as just described, it will be seen that, for high speed operation, a desired portion of the series field winding is utilized while the shunt winding remains deenergized, and for low speed operation both the series winding and the shunt winding are energized. From the above description of my invention, it will also be seen that the shunt coil 26 cannot be energized alone, nor when the coil 27 is energized, unless the coil 28 is also being energized. This arrangement overcomes the possibility of the motor being operated with an inefficient circuit which would burn out one of the windings.

Although various wire sizes may be used for the windings and the number of turns in the coils may be varied to suit different conditions, I have found that satisfactory speed regulation and torque development is obtained when the windings are of the following characteristics: The armature may be wound as any motor manufacturer would wind it for a small universal motor; e. g., for a two inch diameter armature with fourteen slots, each armature coil would contain, say, twenty-two turns of #26 wire or thirty-four turns of #28 wire, or any combination of turns and wire sizes suited to the conditions of speed, torque and line voltage. With such an armature, the primary section 25 of the series winding is wound of magnet wire about as heavy as the wire used in the armature, say two hundred and fifty turns of #26 wire or three hundred turns of #25 wire, or any combination of turns and wire sizes as would be used by any motor builder to obtain the required characteristics. The secondary section 28 of the series winding is made up of the necessary number of turns of finer wire, say one hundred fifty turns of #29 magnet wire, to give an intermediate speed. While the number of turns and the wire sizes may be varied, I find that most efficient operation is obtained when the total number of turns of the shunt winding is substantially equal to the number of turns in the series winding.

The diameter of the wire used in the shunt coil is governed by the speed desired and the current carrying requirements. The motor speed (in "low") varies inversely with the wire size of the shunt coil. For a motor designed for use in a domestic food preparing machine in which intermediate idle running speed is about two-thirds of high speed and low speed is about one-half of intermediate speed, and wherein the stalling torque in low speed is substantially the same as the stalling torque in intermediate speed, I have found that a shunt coil of magnet wire of about one-half the cross-sectional area of the armature wire gives good results.

It will be understood, of course, that the contact 33 and the lead 32 may be omitted if only a two-speed motor is desired, in which case the series winding is energized alone for high speed and the series and shunt windings are energized simultaneously for low speed. Likewise, if desired, other speeds may be had by providing additional taps from the series winding and additional switch contacts.

Figure 4:
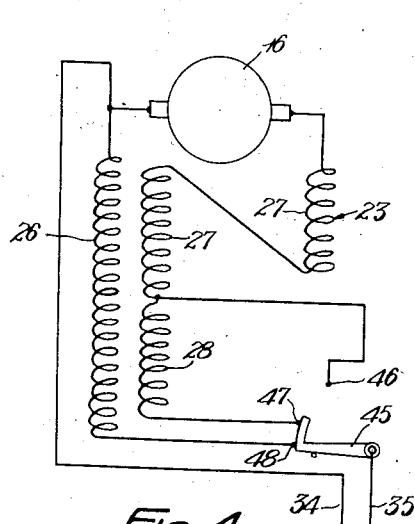
Figs. 4 to 8 inclusive are motor wiring diagrams showing various circuits and connections for motor speed regulation in accordance with my invention.

In constructing my improved variable speed motor, the turns of the series winding and the shunt winding may be distributed as desired in making up the field coils 23. For example, as shown in Fig. 4, substantially one-half of the section 27 of the series winding and the shunt winding 26 may comprise one of the field coils 23, and the other half of this section of the series winding, together with the section 28 of the series winding may constitute the other field coil 23. In the diagram of Fig. 4, the line conductor 35 is shown connected to the movable switch member 45 which may be moved into engagement with the contact 46 to energize the section 27 of the series winding for high speed operation of the motor, as explained above, or may be moved into engagement with the contact 47 for energizing both sections 27 and 28 of the series winding for operation of the motor at an intermediate speed. For low speed operation of the motor, the switch member 45 is moved into engagement with the contacts 47 and 48, as shown in the drawings, so that both the shunt winding and the series winding will be energized from the line conductor 35.

Figure 5:
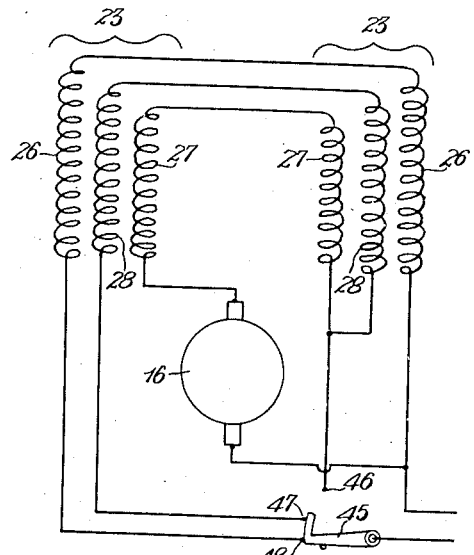

In Fig. 5 of the drawings I have shown substantially the same circuit connections as shown in Figs. 3 and 4, but with the sections 27 and 28 of the series winding and with the shunt winding 26 each divided into two equal sections between the two field coils 23. In other words, each of the field coils 23 embodies substantially one-half of each of the sections of the series winding and one-half of the shunt winding. With the windings distributed in this manner, between the field coils 23, I obtain a balanced arrangement, resulting in a very smoothly and efficiently operating motor. In the arrangement shown in Fig. 5, the contacts 46, 47 and 48 are engaged by the movable switch member 45 to control the motor speeds in substantially the same manner as explained in connection with Fig. 4.

Figure 6:
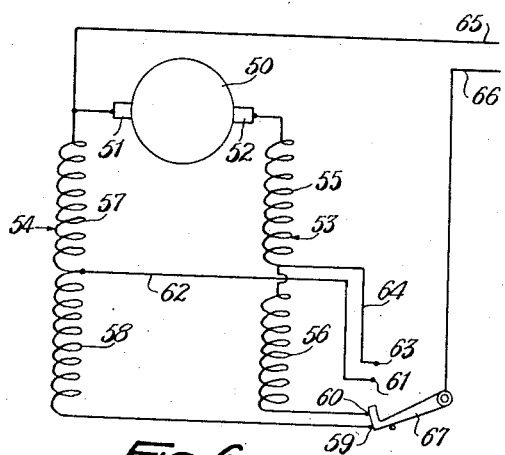

In Fig. 6 of the drawings, I have shown my invention embodied in a variable speed motor having a somewhat different circuit arrangement in that the shunt winding is also divided into two sections. The motor shown in this diagram is provided with an armature 50 having brushes 51 and 52, and is also provided with a series field winding 53 and with a shunt winding 54 in additive relation to the series winding. The series field winding is composed of sections 55 and 56 and the shunt winding is composed of sections 57 and 58.

As shown in the diagram, one end of the shunt winding is connected with the brush 51 and the opposite end of this winding is connected with the contact 59. One end of the series winding is connected with the brush 52 and the opposite end of this winding is connected with the contact 60. A contact 61 is connected with the shunt winding at a point intermediate the sections 57 and 58 by means of the lead 62. A contact 63 is connected with the series winding intermediate the sections 55 and 56 thereof by means of the lead 64. A pair of line conductors 65 and 66 are connected, respectively, to the brush 51 and a movable switch element 67. For high speed operation of the motor, the movable switch member 67 is moved into engagement with the contact 63 so that current flows only through the section 55 of the series field coil. For operation of the motor at a powerful intermediate speed, the contact member 67 is moved into engagement with the contacts 61 and 63 so that energizing current flows through both the section 55 of the series winding and the section 57 of the shunt winding. For low speed operation of the motor, the switch member 67 is moved to the position shown in the drawings, that is, in engagement with the contacts 59 and 60 so that energizing current simultaneously flows through both sections of the shunt winding and through both sections of the series winding.

Figure 7:
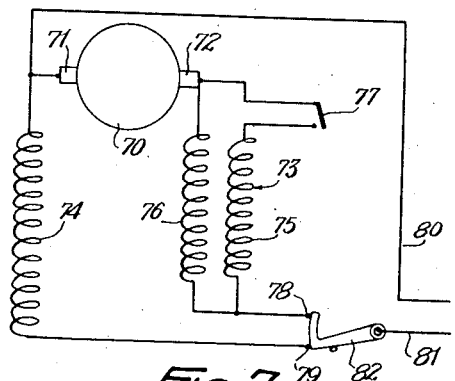

In Fig. 7 of the drawings, I have represented a variable speed motor as having an armature 70 with brushes 71 and 72 cooperating therewith, and also as having a series field winding 73 and a shunt winding 74 in additive relation to the series field winding. The series field winding, as here shown, is composed of two sections 75 and 76 arranged in additive relation to each other and to the shunt winding. One end of the section 76 is connected with the brush 72 and the corresponding end of the section 75 is connected with the brush 72 through a manually operable switch 77. The opposite ends of the sections 75 and 76 are connected to a contact member 78. One end of the shunt winding 74 is connected to the brush 71 and the opposite end of this winding is connected to a contact 79. A pair of line conductors 80 and 81 are connected, respectively, to the brush 71 and the movable switch member 82.

For high speed operation of this motor, the switch 77 is closed and the switch member 82 is moved into position to engage only the contact 78. The energizing current then supplied to the motor field flows through both of the series field sections 75 and 76, and the shunt field winding remains deenergized. For operation of the motor at an intermediate speed, the switch 77 is opened and the switch member 82 engages only the contact member 78. The field current then flows only through the section 76 of the series winding, leaving the series section 75 and the shunt winding 74 deenergized. For operation of the motor at low speed, the switch member 77 is left open and the switch member 82 is placed in engagement with the contacts 78 and 79. The field current then flows through the series field section 76 and the shunt winding 74 but the series field section 75 is left deenergized.

Figure 8:
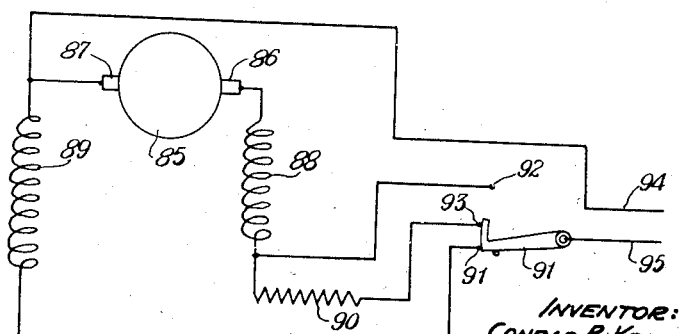

In Fig. 8 of the drawings, I have shown the variable speed motor of my invention as having an armature 85 with brushes 86 and 87 cooperating therewith, and also as having series and shunt field windings 88 and 89 in additive relation. A resistance 90, of suitable value, is connected to one end of the series winding and the other end of the series winding is connected to the brush 86. One end of the shunt winding is connected to the brush 87 and the other end of this winding is connected to a contact 91. The outer end of the series winding 88 is connected to a contact 92 and the outer end of the resistance 90 is connected to a contact 93. A pair of line conductors 94 and 95 are connected, respectively, with the brush 87 and with the movable switch member 96. When the motor is to be operated at high speed, the movable switch member 96 is placed in engagement with the contact 92. The field current then flows only through the series winding 88, and the shunt winding and the resistance are left deenergized. For intermediate speed, the switch member 96 is moved into engagement with the contact 93. The field current then flows through the resistance 90 and the series winding 88, but the shunt winding remains deenergized. For operation of the motor at low speed, the switch member 96 is placed in engagement with the contacts 91 and 93 so that energizing current flows through the series field winding and the shunt field winding at the same time, the flow of current through the series winding being limited according to the value of the resistance 90.

It will be noted from the drawings that the arrangement illustrated in Fig. 8 is generally similar to that illustrated in Fig. 3. From a comparison of these parts of the drawings it will be perceived at once that the shunt coil 89 of Fig. 8 corresponds with the shunt coil 26 of Fig. 3, that the series coil 88 corresponds with the series coil 27 of Fig. 3, and that the resistance 90 corresponds with the portion 28 of the series winding of Fig. 3.

It should now be readily understood, from the accompanying drawings and the foregoing description, that I have provided a novel form of electric motor which is capable of operation at different speeds and of developing a high torque in each of the different speeds with comparatively low current consumption. It will also be seen that with the motor construction and field arrangement which I have provided, the operation of the motor at relatively high speeds is regulated by energizing a desired portion of the series field winding and, for obtaining efficient operation of the motor at low speed, the series field winding and the auxiliary shunt winding are energized simultaneously. With the field arrangement which I have provided, I find that the motor operates efficiently at each of the desired speeds and that the motor is capable of developing high torque at each speed with relatively low current consumption.

While I have illustrated and described my improved motor in a detailed manner, it should be understood, however, that I do not wish to be limited to the precise details of construction and arrangement of parts illustrated and described, but regard my invention as including such changes and modifications as do not involve a departure from the spirit of the invention and the scope of the appended claims.

Having thus described my invention, I claim:

1. The combination with a motor field comprising a series winding, and a shunt winding of substantially the same number of turns as the series winding, of means for selectively controlling the energization of said windings to vary the motor speed, said means comprising a plurality of contacts including a contact connected to one end of the shunt winding, a second contact connected to one end of the series winding, and a third contact connected to the series winding at a point intermediate its ends, and a shiftable switch element adapted to selectively connect the second and third contacts with a power source for operation of the motor at high and intermediate speeds, and to simultaneously connect the first mentioned contact and said second contact with said power source for operation of the motor at a low speed.

2. The combination with a motor field comprising a series winding, and a shunt winding of substantially the same number of turns as the series winding, of means for selectively controlling the energization of said windings to vary the motor speed, said means comprising a plurality of contacts including a contact connected to one end of the shunt winding, a second contact connected to one end of the series winding, a third contact connected to the series winding at a point intermediate its ends, and a fourth contact connected to the shunt winding intermediate its ends, and a shiftable switch element adapted to connect the third contact with a power source for high speed operation of the motor, and to simultaneously connect the third and fourth contacts with said source for operation of the motor at an intermediate speed, and to simultaneously connect the first mentioned contact and said second contact with said source for operation of the motor at low speed.

CONRAD B. KRAUSE.